United States Patent [19]
Gillingham

[11] Patent Number: 6,029,396
[45] Date of Patent: Feb. 29, 2000

[54] ADJUSTABLE POTTED PLANT STAND

[76] Inventor: Robert Gillingham, 17382 S. Angeline Ave. NE., Suquamish, Wash. 98392

[21] Appl. No.: 08/877,132

[22] Filed: Jun. 17, 1997

Related U.S. Application Data

[60] Provisional application No. 60/020,815, Jun. 20, 1996.

[51] Int. Cl.[7] .................................................. A47G 7/00
[52] U.S. Cl. ................................. 47/39; 47/70; 248/909
[58] Field of Search .................... 47/39, 70; 248/909, 248/346.4

[56] References Cited

U.S. PATENT DOCUMENTS

| | | |
|---|---|---|
| 292,197 | 1/1884 | Barbour . |
| 837,388 | 12/1906 | Curial . |
| 1,481,137 | 1/1924 | Lemke et al. . |
| 2,003,159 | 5/1935 | Taylor ...................................... 248/909 |
| 2,095,672 | 10/1937 | Miller . |
| 2,095,686 | 10/1937 | Alfreds . |
| 2,210,102 | 8/1940 | Steudel . |
| 4,206,570 | 6/1980 | Cooper . |
| 4,319,727 | 3/1982 | Rattay . |
| 4,833,823 | 5/1989 | Edwards, III . |
| 4,872,283 | 10/1989 | Yinger ......................................... 47/70 |
| 4,965,963 | 10/1990 | Lyon . |
| 5,181,686 | 1/1993 | Barthel . |
| 5,309,670 | 5/1994 | Bates . |
| 5,321,909 | 6/1994 | Loran . |
| 5,501,038 | 3/1996 | Gregoranto ................................. 47/70 |

FOREIGN PATENT DOCUMENTS

| | | | |
|---|---|---|---|
| 2227785 | 11/1974 | France ....................................... 47/39 |
| 2519513 | 7/1983 | France ....................................... 47/70 |
| 2561750 | 9/1985 | France ....................................... 47/39 |
| 2323763 | 11/1974 | Germany .................................... 47/70 |
| 2191673 | 12/1987 | United Kingdom ....................... 47/70 |

*Primary Examiner*—Michael J. Carone
*Assistant Examiner*—Joanne C. Downs

[57] ABSTRACT

A device for supporting plant pots on a floor surface so as to permit evaporation of moisture from therefrom and which is easily manually adjustable to fit plant pots of varying size.

13 Claims, 3 Drawing Sheets

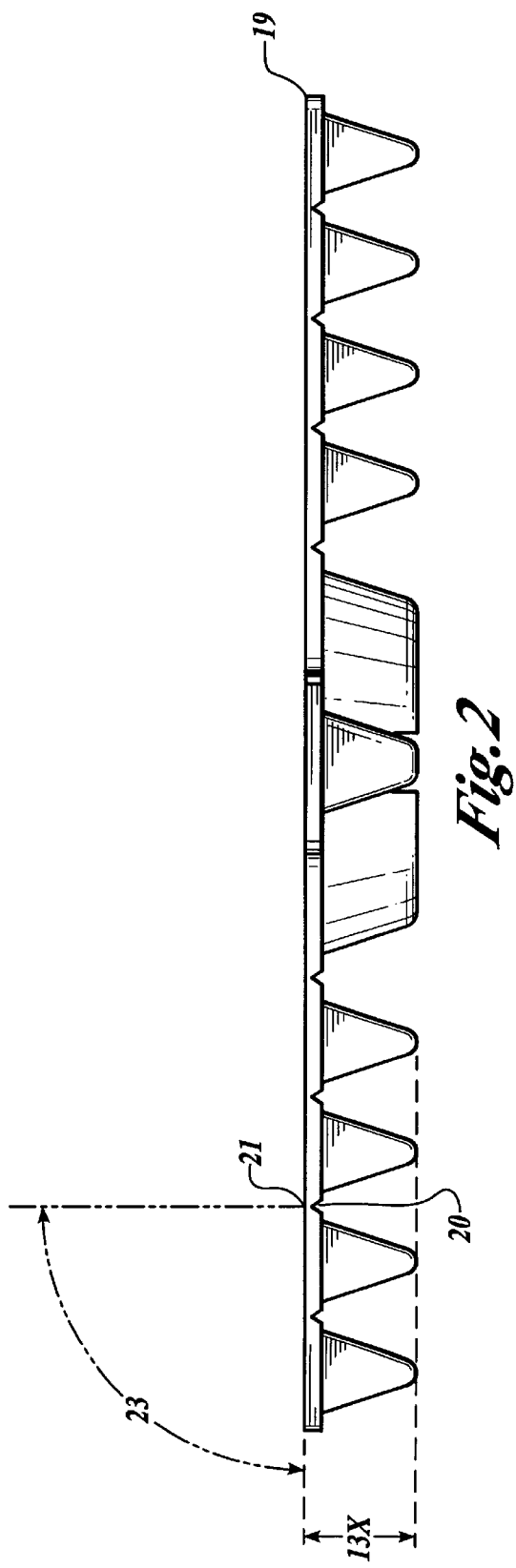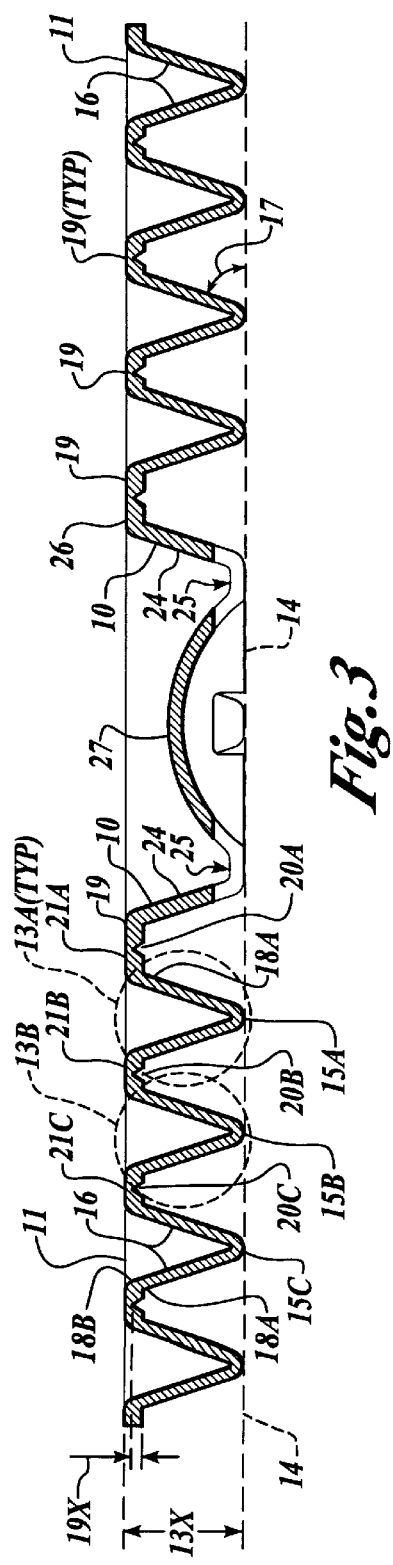

ADJUSTABLE POTTED PLANT STAND

This application claims the benefit of U.S. Provisional Application No. 60/020,815, filed Jun. 20, 1996.

FIELD OF THE INVENTION

The present invention relates generally to supporting potted plant containers, and more particularly to elevating such containers so as to minimize damage to the flooring surface below the potted plant due to the inability of moisture to evaporate therefrom.

BACKGROUND OF THE INVENTION AND THE PRIOR ART

Devices for supporting potted plant containers are generally well known. The more common of these generally take the form of a plate or bowl of various shapes designed to hold the pot as well as capture a limited amount of excess water from the pot itself One problem with such devices is that they generally do not permit water which may accumulate beneath themselves on the floor surface to evaporate. Because the moisture cannot evaporate, mold, mildew, fungus and rot can develop and can stain, deteriorate or destroy the floor surface on which the plant pot support is placed.

Less well known are devices for elevating the plant pot so as to permit evaporation of any moisture which might accumulate under the pot due to over-watering, seepage, or condensation. It is therefore an object of the present invention to permit evaporation of moisture under the plant pot so as to prevent stains, rot, mold, mildew and other moisture-induced deterioration or destruction of the floor surface upon which the plant pot support rests.

The few existing devices which elevate to permit evaporation, however, are not easily adjustable in size. As a result, a support for an eight-inch diameter pot, for example, would not be suitable for a six-inch diameter pot as it would extend out from beneath the pot and so detract from the aesthetic appearance of the plant pot. Thus, many typical purchasers, who may not usually come to the plant or garden store equipped with specific measurements or dimensions of their various plant pots, must guess which size support to purchase, or purchase more than is needed. Under such circumstances, some purchasers may well decline purchasing at all. It is therefore an object of the present invention to provide a plant pot support which is extensively and easily adjustable and one-size-fits-all.

Some support devices in other fields exist which are mechanically adjustable. However, adjusting such devices ordinarily requires the use of tools and are therefore inconvenient for most purchasers. Similarly, some such devices require for their adjustment repetitively moving parts which are ordinarily more subject to wear and failure in operation than devices not subject to repetitive mechanical operation. It is therefore an object of the present invention to provide a plant pot support which is very easily manually adjustable, without the use of any tools, and without any repetitively moving parts subject to wear and failure in operation.

Many plant pots, particularly the larger ones, are quite heavy. As a result, it is important to distribute the live load somewhat over the floor surface area so as to avoid damage to the floor surface due to puncture or scratching. Similarly, if the floor surface is carpeted, particularly with deeper pile, such load distribution can be essential to retaining the elevating and evaporating functions described above. It is therefore an object of the present invention to provide a plant pot support which, while still elevating the pot as described above, also distributes the load of the plant pot in a manner which prevents damage to hard floor surfaces and retains sufficient elevating and evaporation properties over a deep pile carpeted floor.

Finally, most or all of the prior devices are more costly to manufacture and produce than the present invention. The present invention, notwithstanding attainment of all of the foregoing objectives, due to its extremely elegant simplicity, can also be manufactured at almost negligible cost.

SUMMARY OF THE INVENTION

The present invention comprises a support device for plant pots which elevates the pot so as to permit air flow and consequent evaporation of moisture from thereunder, and which is easily manually adjustable in size, without the use of any tools, so as to be concealed from ordinary observation and hence not diminish the aesthetic appearance of pots of various sizes.

BRIEF DESCRIPTION OF THE DRAWINGS

The foregoing aspects and many of the other attendant advantages of this invention will become more readily appreciated as the same becomes better understood by reference to the following detailed description, when taken in conjunction with the accompanying drawings, wherein:

FIG. 2 is a side view of the invention;

FIG. 3 is a cross-sectional view of two typical radial arms of the invention taken along section line A—A of FIG. 2.

DETAILED DESCRIPTION OF THE PREFERRED EMBODIMENT

Figure 1:
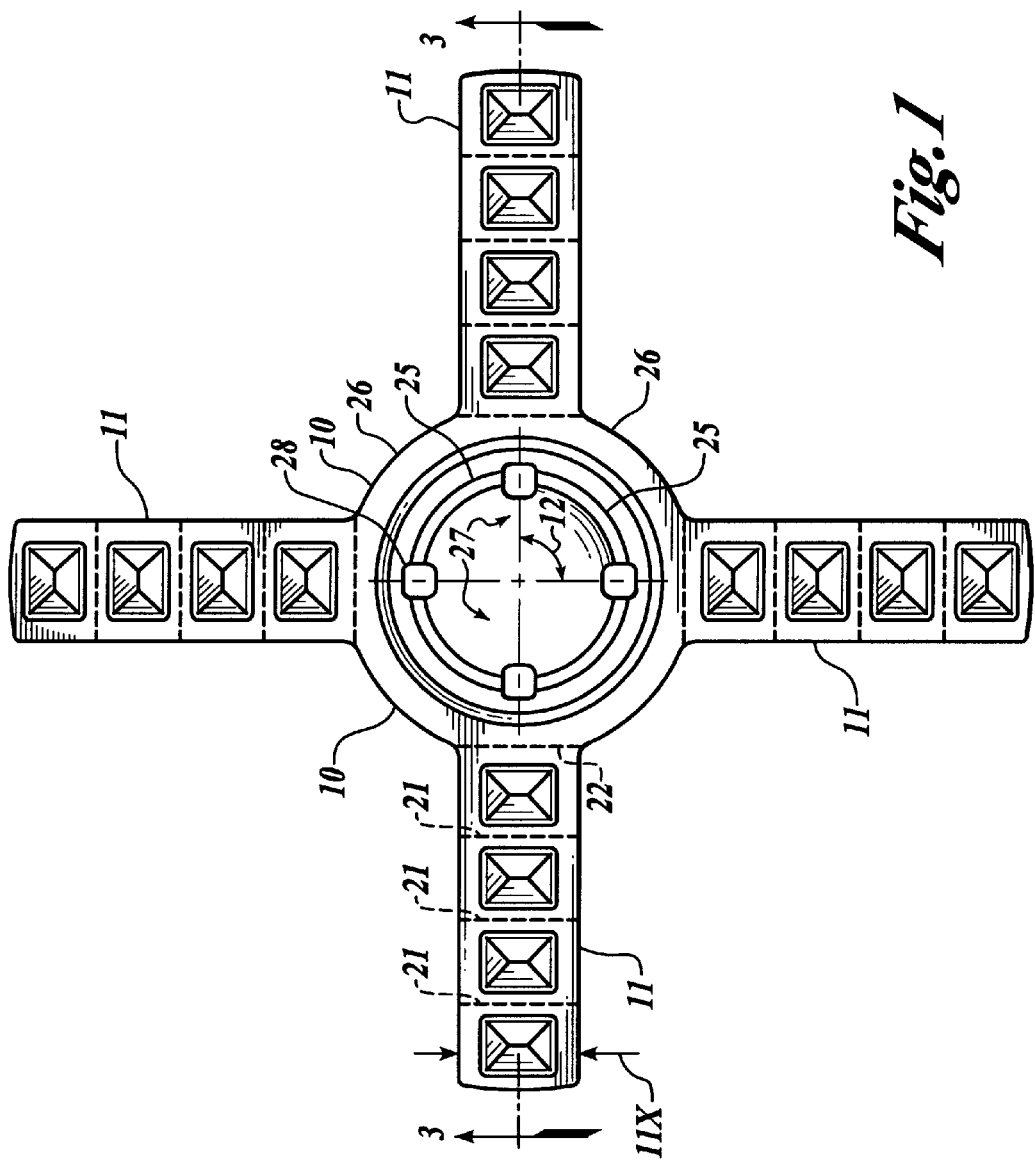
FIG. 1 is a plan view of the invention.
Figure 4:
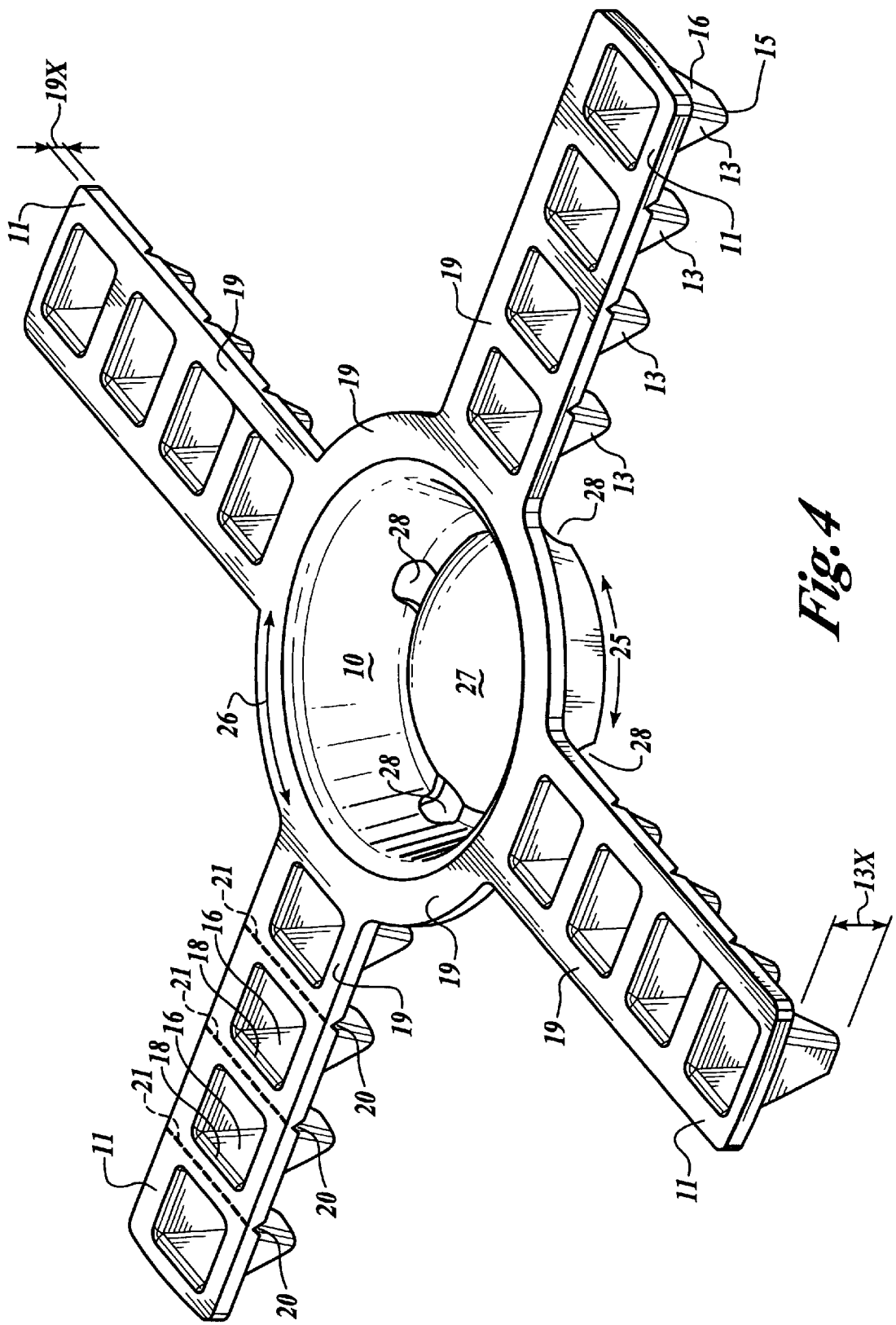
FIG. 4 is an isometric view of the preferred embodiment of the invention.

Referring now to FIGS. 1 and 4, the invention is comprised of a central ring 10 with four radial arms 11, of thickness 11X, coplanar and at right angles 12 to each other such that they form an equilateral cross or "X" in this top or plan view. Referring now to FIGS. 2 and 3, each of the radial arms 11 is comprised of a collinear and coplanar series of identical inverted hollow typical cells 13, of height 13X. Each cell is quadrilateral in plane and pyramidal in elevation, and inverted so as to have the more narrowly tapered end pointing downward and contacting the floor surface 14. Thus, in this side view, the bottom portion 15 of each cell 13 rests on the floor surface 14. Further, each side 16 tapers wider or apart from one another as they extend further upward from the bottom portion 15 of each cell. As a result, the sides 16 form an acute angle 17 with the horizontal floor surface 14.

The first cell 13A adjacent to the central ring 10 in each radial arm 11 is connected to the central ring 10 at its top edge 18A by a thin top layer 19, of thickness 19X, continuous along and integral with the top of all cells 13 in each radial arm 11, which has an underside notch 20A. This notch provides a weakened zone that so reduces the net section of the top layer 19 of the cell 13 that a natural breaking or yield line 21A is formed laterally across the top layer 19 just above the notch 20A.

The next cell 13B adjacent to cell 13A is connected to 13A in the same manner that cell 13A is connected to central ring 10. Specifically, the top edge 18B of cell 13B is connected to the top edge 18A of cell 13A by the thin top layer 19 which continues colinearly and coplanarly along the top of all cells 13. This thin top layer 19 also has an underside notch 20B equidistant between cell 13A and 13B. This notch so reduces the net section of the top layer 19 so as to create a natural breaking or yield line 21B laterally across the layer 19 just above the notch 20B.

Each subsequent typical cell 13 is connected to the adjacent typical cell 13 next closer to central ring 10 in the same manner as cell 13B is connected to cell 13A as described above. Such adjacently connected cells 13 continue along and comprise the radial arms 11.

Referring again to the plan view of FIG. 1, the typical underside notches 20 and corresponding superimposed yield or breaking points 21 are equidistant between adjacent cells 13. The yield or breaking points 21 form a line completely across and perpendicular to the radial direction of the radial arm 11 in which each yield line is situated. Thus, to further clarify, each yield or breaking point 21 forms a line parallel with the tangent 22 of the central ring 10 at the point where the central ring 10 is intersected by the radial arm 11.

To further understand the adjustability feature of the present invention, refer to the elevation or side view in FIG. 2. When any two adjacent cells 13 are grasped and partially rotated back and forth in the directions depicted by arrows 23 around the axis formed by the yield or breaking line 21, the connection between the two adjacent cells 13 will be broken along the yield or breaking line 21. In the same manner any cell 13 (along with any other cells 13 farther away from the central ring 10 along the same radial arm 11) can be quickly and easily detached by hand from the adjacent cell 13 next nearer the central ring 10. Ordinarily, with cylindrical or otherwise symmetrical plant pots, the number of cells 13 snapped off in the foregoing manner would be the same along each radial arm 11 such that the radial arms 11 would all be of the same length, thus preserving the symmetry of the entire support device.

The amount of rotation, or number of times back and forth as depicted by arrows 23 required to break said connection could be as few as once or twice, but will largely depend upon the material of which the invention is composed. The intended material for the preferred embodiment is any lightweight, low-cost, semi-brittle plastic resin that can be easily and economically molded in one single solid piece in mass production. However, it can be seen that a great variety of materials of varying degrees of brittleness or ductility and strength known to those skilled in the art would be satisfactory for the above functions.

Referring to FIGS. 1 and 3, the central ring 10 is cup-shaped, being comprised of a circumferential tapered sidewall 24, a flat, discontinuous bottom ring 25 connected to the bottom thereof which rests on the floor surface 14 and a flat top ring 26 of slightly larger diameter which connects to and is integral with the continuous top layer 19 of each radial arm 11. The central ring 10 also contains a convex central portion 27. To promote air circulation and consequent evaporation, bottom ring 25 is perforated with small apertures 28 beneath each radial arm 11.

For purposes of ventilation, only the bottom portions 15 of the cells 13 and the flat bottom ring 25 of the central ring 10 touch the floor 14 when the plant support device is in use. On the other hand, for purposes of load distribution, this is a sufficient amount of surface area to distribute the load of the pot and its contents to prevent damage to the floor surface 14 from point or concentrated loads, or associated scratching.

For a better appreciation and understanding of the preferred embodiment, and the relationship between the elements described above, the reader is referred now to the isometric or perspective view depicted in FIG. 4. In FIG. 4 the continuity of top layer 19, and the integral connection of the cells 13 thereto, can be more clearly seen. The entire device can be easily molded and manufactured as a single, solid piece.

While the currently preferred embodiment of the invention has been illustrated and described, it will be appreciated that various changes can be made therein without departing from the spirit and scope of the invention. For example, it is not necessary that there be exactly four radial arms. If radial arms are used, any number greater than two would work as well. Moreover, it is not necessary that radial arms be used at all. Instead, the radial arms 11 holding the cells 13 could be substituted with a series of concentric rings, squares or other shapes also easily manually detachable in a manner similar to that described above, and still retain the simple adjustability feature of the invention.

Similarly, the precise shape, size or number of the detachable cells 13 are not essential to the invention. The cells 13 could be conical or cubic, hollow or solid, for example. They could be fewer or greater in number than that described in the attached FIGS. 1–4 of the preferred embodiment. They could be taller or shorter, wider or narrower, all without departing from the spirit and scope of the invention.

Nor is it necessary that the central ring 10 be round. It could be of any shape, so long as it is essentially coplanar on its top and bottom with the detachable cells 13. Nor is it necessary that the central ring 10 contain the partial hemisphere 27.

Similarly, the snap-off adjustability feature of the invention can be accomplished in alternate ways. Specifically, while in the preferred embodiment the weakened zones giving rise to the yield or breaking lines 21 are created by the notches 20, such weakened zones could also be created by otherwise reducing the thickness of the top layer 19 along yield or breaking lines 21. Alternatively, the density, material or composition of material forming the top layer 19 could be altered to create the desired weakened zone along the yield lines 21. Furthermore, there need not be one detachment zone for each cell. For instance, detachment zones could be placed between each cell, between every two cells, or in any other pattern. Likewise, the innermost detachment zones may be placed adjacent to the central ring, or may start after one or more rings of cells, all without departing from the spirit of the invention.

The embodiments of the invention in which an exclusive property or privilege is claimed are defined as follows:

1. An adjustable support for supporting objects such as potted plants on floors or other surfaces in such a manner as to permit evaporation of moisture from underneath the objects, the adjustable support system comprising:

(a) a support surface including an upper surface for supporting the objects thereon and an undersurface and comprising a central ring having a plurality of radial arms attached thereto;

(b) a plurality of separate and distinct cells depending downwardly from the support surface, each cell having a height dimension so as to elevate the support surface above the floor or other surface, the plurality of cells being spaced apart from each other to define a plurality of gaps therebetween underneath the support surface, the cells being configured and arranged to support objects on a floor or other surface; and (c) wherein one or more of the plurality of cells may be severed to thereby adjust the size of the support surface to accommodate objects of varying sizes.

2. The adjustable support system of claim 1, wherein the support surface comprises a plurality of detachment zones, wherein there is one detachment zone which corresponds to each of the plurality of cells, and wherein the detachment zones permit detachment of the corresponding cell by bending, rotating, twisting, or otherwise moving the cell to be detached about the detachment zone.

3. The adjustable support system of claim 2, wherein each detachment zone comprises a region of the support surface having a smaller cross-sectional area than the average cross-sectional area of the support surface.

4. The adjustable support system of claim 2, wherein each detachment zone comprises one or more notches in the support surface.

5. The adjustable support system of claim 2, wherein each detachment zone comprises a section of the support surface having weaker structural characteristics than the surrounding support surface.

6. The adjustable support system of claim 5, wherein each detachment zone further comprises a reduction in the density of support surface material.

7. The adjustable support system of claim 5, wherein each detachment zone further comprises a region of material that is weaker than the material of the support surface.

8. The adjustable support system of claim 1, wherein
  (a) the plurality of radial arms comprise the plurality of cells, each of the cells including a corresponding detachment zone which permits detachment of a corresponding cell by bending, rotating, twisting, or otherwise moving the cell to be detached about the corresponding detachment zone, each of the radial arms being of the same size and shape; and wherein
  (b) the size and shape of each of the plurality of cells of one of the plurality of radial arms is the same as the size and shape of each of the plurality of cells in corresponding locations of the others of the plurality of radial arms.

9. A stand for supporting an object at an elevation above a horizontal surface, the stand comprising:
  (a) a central ring;
  (b) at least three radial arms extending from the central ring, each arm including an upper surface for supporting the object thereon and an undersurface;
  (c) a plurality of separate and distinct hollow cells attached to the undersurface of each arm, the hollow cells having a height dimension to support the undersurface of the arm at an elevation above the horizontal surface, the hollow cells on each arm being spaced apart from each other to define gaps therebetween underneath the undersurface; and
  (d) wherein the arms include a plurality of weakened sections between the plurality of hollow cells, the weakened sections being adapted to be cut so as to shorten the length of the arm.

10. The stand of claim 9, wherein each weakened section comprises a reduction in the density of the arm.

11. The stand of claim 9, wherein each weakened section comprises a notch provided on the arm.

12. The stand of claim 9, wherein four radial arms are provided.

13. The stand of claim 12, wherein the four radial arms meet at a right angle with respect to each other to form an equilateral cross.

* * * * *